(12) United States Patent
Gunnink et al.

(10) Patent No.: US 10,894,389 B2
(45) Date of Patent: *Jan. 19, 2021

(54) LAMINATE OF MUTUALLY BONDED ADHESIVE LAYERS AND SPLICED METAL SHEETS

(71) Applicant: GTM-Advanced Products B.V., s-Gravenhage (NL)

(72) Inventors: Jan Willem Gunnink, Nieuwerkerk aan den IJssel (NL); Simon Gunnink, Delft (NL); Johannes Jan Homan, Bergschenhoek (NL)

(73) Assignee: GTM-Advanced Products B.V., 's-Gravenhage (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/463,199

(22) PCT Filed: Nov. 23, 2017

(86) PCT No.: PCT/NL2017/050768
§ 371 (c)(1),
(2) Date: May 22, 2019

(87) PCT Pub. No.: WO2018/097719
PCT Pub. Date: May 31, 2018

(65) Prior Publication Data
US 2019/0375191 A1 Dec. 12, 2019

(30) Foreign Application Priority Data
Nov. 23, 2016 (NL) ...................................... 2017850

(51) Int. Cl.
*B32B 15/08* (2006.01)
*B32B 15/04* (2006.01)
(Continued)

(52) U.S. Cl.
CPC .............. *B32B 15/043* (2013.01); *B32B 3/14* (2013.01); *B32B 5/12* (2013.01); *B32B 15/14* (2013.01);
(Continued)

(58) Field of Classification Search
CPC ... Y10T 428/192; Y10T 428/197; B32B 3/08; B32B 15/08; B32B 15/14; B32B 15/20; B32B 7/14; B64C 1/12
(Continued)

(56) References Cited

U.S. PATENT DOCUMENTS

| 5,429,326 A | 7/1995 | Garesche et al. |
| 6,736,919 B1 | 5/2004 | Roebroeks |

(Continued)

FOREIGN PATENT DOCUMENTS

| EP | 2907654 A1 | 8/2015 |
| WO | 9853989 A1 | 12/1998 |

(Continued)

*Primary Examiner* — Alexander S Thomas
(74) *Attorney, Agent, or Firm* — The Webb Law Firm (57) ABSTRACT

Described is laminate of a stack of mutually bonded adhesive layers and metal layers. An outer metal layer has spliced metal sheets having overlapping end parts and/or abutting metal sheet edges extending in a first and a different second planar direction of the laminate to define first and second splice lines. Connected to an outer surface are first and second splice straps covering the first and second splice lines. A lateral edge part of each splice strap has a lower bending stiffness than the bending stiffness of the outer metal layer sheets, the edge part being defined as extending from an outer lateral edge of a splice strap over a lateral distance of at least 5 times the edge part average thickness. The laminate may be used for making large structural components, such as a wing or fuselage of an aircraft.

20 Claims, 8 Drawing Sheets

(51) Int. Cl.
  *B32B 3/14*      (2006.01)
  *B32B 5/12*      (2006.01)
  *B32B 15/14*     (2006.01)
  *B64C 1/12*      (2006.01)

(52) U.S. Cl.
  CPC ..... *B32B 2307/552* (2013.01); *B32B 2605/18* (2013.01); *B64C 1/12* (2013.01); *Y10T 428/192* (2015.01); *Y10T 428/197* (2015.01)

(58) Field of Classification Search
  USPC ........................................................ 244/131
  See application file for complete search history.

(56) References Cited

U.S. PATENT DOCUMENTS

| | | |
|---|---|---|
| 2007/0042214 A1 | 2/2007 | Rajabali et al. |
| 2015/0225061 A1 | 8/2015 | Beumler |
| 2017/0050411 A1 | 2/2017 | Rajabali |
| 2017/0080671 A1 | 3/2017 | Gunnink et al. |

FOREIGN PATENT DOCUMENTS

| | | |
|---|---|---|
| WO | 2005032805 A1 | 4/2005 |
| WO | 2015142170 A1 | 9/2015 |
| WO | 2015163764 A1 | 10/2015 |
| WO | 2017048122 A1 | 3/2017 |

LAMINATE OF MUTUALLY BONDED ADHESIVE LAYERS AND SPLICED METAL SHEETS

CROSS-REFERENCE TO RELATED APPLICATIONS

This application is the United States national phase of International Application No. PCT/NL2017/050768 filed Nov. 23, 2017, and claims priority to Dutch Patent Application No. 2017850 filed Nov. 23, 2016, the disclosures of which are hereby incorporated by reference in their entirety.

FIELD OF THE INVENTION

The present invention relates to a laminate comprising a stack of mutually bonded adhesive layers and metal layers, wherein an outer metal layer defining an outer surface of the stack comprises metal sheets having overlapping end parts and/or abutting metal sheet edges. The invention further relates to a structural component for a vehicle, spacecraft, or aircraft, comprising a laminate according to the present invention. The invention further relates to an aircraft comprising a laminate according to the present invention.

BACKGROUND ART

Laminates of mutually bonded adhesive layers and metal sheets are used for structural purposes, for instance in the aircraft industry. Because metal sheets are available in limited widths only, for instance up to 1.5 m, and in order to obtain large panels of such laminates, typical laminates comprise layers of spliced metal sheets, having abutting and/or overlapping metal sheet edges, extending parallel to each other along a length direction of the laminate. This allows obtaining laminate panels having a larger width than the production width of the metal sheets. Making use of laminates having spliced metal sheets in a length direction of the sheets may for instance occur in wings or fuselage of aircraft, where the longitudinal (spanwise) direction of the wing or the longitudinal (flight) direction of the fuselage corresponds to the length direction. Using splices in a laminate no longer restricts the maximum width of a laminate to a metal sheet width that is limited by present day metal sheet manufacturing technology.

Since the splices in the metal layers extend parallel to each other, their influence on the mechanical properties of the laminate is relatively modest. In some laminates, the splice region of the laminate is covered with a splice strap or doubler to prevent exposure of the splices to environmental conditions, and/or to optionally strengthen the laminate in a direction transverse to the length direction of the laminate, i.e. in the width direction of the metal sheets.

Since a laminate comprises a stack of mutually bonded adhesive layers and metal layers, the metal sheets that constitute the metal layers preferably need to be pre-treated (anodized and/or primed) before bonding them to other layers of the laminate. This poses another limitation to the production size of a metal sheet, since pre-treatment tanks have limited length. Even when using metal layers comprising metal sheets that are positioned one against the other (or overlapping each other) in a width direction of the metal sheets, other dimensions may be limited. There is however a need to make panels of increasing size in all directions. It would for instance be desirable to be able to make very wide and long fuselage panels for aircraft of ever increasing size.

It is an object of the present invention to provide a laminate allowing to make products of a larger size than known nowadays. It is a further object of the present invention to provide a laminate allowing making panels for aircraft, such as fuselage panels, of a larger size than known nowadays. It is yet another object of the invention to provide a laminate allowing to make larger products with an adequate strength and/or adequate stiffness, and improved fatigue behavior.

SUMMARY OF THE INVENTION

This and other objects are achieved by providing a laminate in accordance with claim 1. The laminate comprises a stack of mutually bonded adhesive layers and metal layers, wherein an outer metal layer defining an outer surface of the stack comprises metal sheets having overlapping end parts and/or abutting metal sheet edges extending in a first and in a different second planar direction of the laminate and defining a first and a second splice line that intersect one another under an angle in a common splicing region; and a first splice strap connected to the outer surface and covering the first splice line over a first splice strap lateral width; a second splice strap connected to the outer surface and covering the second splice line over a second splice strap lateral width; wherein the first and second splice straps comprise a stack of at least one metal layer bonded to at least one adhesive layer for connection to the outer surface of the stack, and/or at least one fiber reinforced adhesive layer, and wherein the bending stiffness $E*t^3$ in the lateral width direction of a lateral edge part of each splice strap is less than the bending stiffness of the outer metal layer sheets, the edge part being defined as extending from an outer lateral edge of a splice strap over a lateral distance of at least 5 times the edge part average thickness.

The bending stiffness of a part in accordance with the invention is defined as the product of the modulus of elasticity 'E' in bending and the third power of the average thickness 't' of the part. Please note that the bending stiffness has the dimensions of N*m, whereas a modulus of elasticity has the dimensions of $N/m^2$. For determining the elastic constants of a fiber-reinforced composite, ASTM 3039 is commonly used. For determining the elastic constants of a metal, ASTM E111 is commonly used.

The invented laminate has at least a first and a second splice line that intersect one another in a common splicing region under a non-zero angle. This allows making panels with larger dimensions in any direction, in particular in directions extending perpendicularly to the directions of the splice lines.

At the common splicing regions where splice lines intersect, a weakening of the laminate should be expected. Indeed, at these locations discontinuities in the metal sheets occur and stress concentrations are to be expected. The stress concentrations may negatively affect strength and fatigue life of the laminate, which strength and fatigue life are an important design parameter, in particular for aircraft structures. The negative effects on strength and fatigue life are expected to be worse in laminates having relatively thick and/or stiff metal layers, in particular exceeding 0.3 mm for aluminum layers, and/or at relatively low temperatures, for instance below 0° C. A laminate in accordance with the invention surprisingly has at least a similar fatigue life as a laminate with smaller dimensions and free from any splice lines. Fatigue life, in the context of the present application, may be measured by monitoring crack growth rate and/or the number of load cycles to failure at a certain load.

A spliced layer in the stack of the laminate may comprise two abutting metal sheets and/or two metal sheets with overlapping edge parts. A splice line in the case of two abutting metal sheets is defined as the line extending between the abutting metal sheets. In the case of overlapping end parts of two metal sheets, the overlapping edges of the two metal sheets form two splice lines at a distance from each other equal to the width of the overlap. A common splicing region of the laminate is defined as that region of the laminate wherein splice lines between abutting metal sheets and/or a pair of splice lines defined by overlapping metal sheet edges intersect. The adhesive layer(s) in the stack between metal sheets is preferably continuous through any splicing region and therefore bridges splice lines. The first and second directions are planar in the sense that they are defined in the plane of the laminate stack that extends perpendicular to the thickness direction of the laminate stack.

The adhesive layers in the stack of the laminate and/or in the splice straps for some embodiments may be used as such. Preferred embodiments of the invention however provide a laminate stack and/or splice strap wherein the adhesive layers comprise reinforcing fibers to form a fiber-metal laminate and/or a fiber-reinforced splice strap.

The first and second splice straps each extend across a splicing region, by which is meant that each splice strap covers a splice line along its extension, and moreover has a certain lateral width defining the splicing regions width. The wording 'substantially' in the context of the present inventions means at least 90% of the indicated variable or subject.

Connecting the splice straps to the stack may be achieved by any means, but adhesive bonding is preferred. Any adhesive may be used, including the same adhesive as that used in the adhesive layers of the stack of the laminate. The adhesive may be applied as a separate layer or may be part of a fiber-reinforced adhesive layer. In this case, a strap bonding adhesive layer is provided with reinforcing fibers. It is also possible that other strap layers comprises a fiber-reinforced adhesive layer, for instance in the form of a pre-impregnated intermediate product or 'prepreg'. Such splice strap may be bonded to the laminate as such, and the adhesive within the splice strap will partly form the adhesive layer connecting the splice strap to the stack of the laminate.

A splice strap in useful embodiments comprises a metal sheet or strip, for instance made from the same metal as the metal sheets of the laminate stack. In accordance with another embodiment of the invention, a laminate is provided wherein the first and/or second splice strap comprises stacked splice strap layers, preferably of fiber-reinforced adhesive, in another embodiment of metal sheets, and in yet another embodiment of a combination of mutually bonded metal sheets and fiber-reinforced adhesive layers. The stacking sequence of the first and second splice strap can be provided outside-in or, preferably, inside-out; meaning respectively that a smallest layer is adjacent to the stack of the laminate, or a widest strap layer is adjacent to the laminate stack. It is also possible that all layers of a splice strap have the same width.

According to the invention, the bending stiffness $E*t^3$ in the lateral width direction of a lateral edge part of each splice strap is less than the bending stiffness of the outer metal layer sheets. The metal sheets of the outer metal layer may have a different thickness or may have the same thickness, and the bending stiffness of the lateral edge part of each splice strap should be less than the smallest bending stiffness of the metal sheets defining the splice line that is covered by the splice strap, at least when these bending stiffness's are different. In an embodiment of the invention, the bending stiffness of the edge part is less than 80% of the bending stiffness of the outer metal layer sheets, and preferably less than 60% of the bending stiffness of the outer metal layer sheets.

In a further embodiment of the invention, one of the first or the second splice strap covers the common splicing region and the other is interrupted in the common splicing region. This embodiment has the advantage that less thickness is built up in the common splicing region. It may in some cases also be advantageous to provide a laminate wherein the first and the second splice straps overlap in the common splicing region to both cover the common splicing region. The first and second splice straps may be in the form of an oblong strip of material extending in the first and second planar direction of the laminate. In other embodiments, the first and second splice strap may be made in one piece, for instance to form a cross in the common splicing region.

The non-zero acute angle between the first and second planar directions of the splice lines may be chosen at will and may vary from close to 0° up to and including 90°, depending on the product dimensions that need to be extended. A preferred embodiment provides a laminate wherein the angle between the first and second planar directions ranges from 45° to 90° inclusive, more preferably from 50° to 90° inclusive, and most preferably from 55° to 90° inclusive. Such a range for instance is preferred for swept wings in aircraft.

In a further embodiment of the invention, the outer metal layer comprises metal sheets having abutting edges, preferably extending along the first and the second planar direction. In the latter embodiment, the thickness built-up in the laminate at the common splicing region is minimal. In another embodiment, the outer metal layer comprises metal sheets having overlapping end parts, preferably extending along the first and the second planar direction. Such embodiments may be beneficial from a strength point of view.

In yet another embodiment, a laminate is provided wherein the outer metal layer comprises at least three metal sheets, wherein at least two of the metal sheets have overlapping end parts extending along the first planar direction and at least two of the metal sheets have abutting edges extending along the second planar direction.

The metal sheets of the outer metal layer in the common splicing region may be positioned with respect to each other in any conceivable order. A preferred embodiment provides a laminate wherein a first metal sheet and a second metal sheet have abutting end parts within a first splicing region, a third metal sheet and a fourth metal sheet have metal sheet edges within a second splicing region arranged substantially coinciding with each other along the second planar direction in the plane of the stack, and wherein the third metal sheet and the fourth metal sheet have overlapping end parts within the first splicing region and the second splicing region with the first and the second metal sheet, respectively.

In yet another embodiment of the laminate, wherein the third metal sheet and a fourth metal sheet have abutting end parts within the second splicing region. In such an embodiment, overlapping end parts of the third metal sheet and the fourth metal sheet are arranged at the same side of the stack relative to the overlapping end parts of the first metal sheet and the second metal sheet. Another embodiment provides a laminate wherein overlapping end parts of the third metal sheet are arranged at a side of the first metal sheet opposite to the overlapping end parts of the fourth metal sheet arranged at another side of the first metal sheet.

In another aspect of the invention, a laminate is provided comprising two of said outer metal layers, one outer metal layer being located at one side of the stack and another outer metal layer being located at another side of the stack opposite the first side, wherein at least one of the two outer metal layers is provided with said first and second splice straps. An embodiment wherein one of the two outer metal layers is provided with said first and second splice straps only is for instance appropriate in case of a wing or fuselage section, where an inner side of the wing or fuselage section needs not be provided with splice straps, in particular when said outer metal layer of the stack at the inner side of the wing or fuselage section comprises overlapping metal sheets. In a preferred embodiment, the two outer metal layers are each provided with said first and second splice straps.

The one outer metal layer and the other outer metal layer may comprise abutting and/or overlapping metal sheets. A very suitable embodiment relates to a laminate wherein the one outer metal layer has abutting metal sheet edges extending along its first and second planar direction, and the other outer metal layer has abutting metal sheet edges along its first and second planar direction. In a further preferred embodiment, the first and second planar direction of the one outer metal layer are substantially parallel to the first and second planar direction of the other outer metal layer.

The splice lines of the one outer metal layer and the splice lines of the other outer metal layer may be positioned on top of each other but for improvement of the mechanical properties of the laminate, the splice lines are preferably offset with respect to each other over an offset distance. The direction of the offset may be chosen at will but a practical embodiment provides a laminate, wherein the offset distance in the first planar direction is equal to the offset distance in the second planar direction.

In embodiments wherein splice lines in the outer metal layers are offset relative to each other, a suitable offset distance may have to be chosen. Useful embodiments provide a laminate wherein the offset distance in the first and/or second planar direction is at least equal to 5 times, and more preferably at least 10 times the thickness of the one outer metal layer or of the other outer metal layer, whichever has the larger thickness. These embodiments provide a lower limit to the preferred offset distance in the first and/or in the second planar direction.

An upper limit to the preferred offset distance may be provided by an embodiment in which the first and second splice straps of the one outer metal layer and of the other outer metal layer each cover an offset distance of at most 100 times, more preferably at most 50 times, and most preferably at most 25 times the thickness of the one outer metal layer or of the other outer metal layer, whichever has the larger thickness. The width of the first and second splice strap in this embodiment is then sufficient to cover both offset splice lines in the respective direction. A preferred embodiment, the width of the first and second splice strap is at most 100 times, and more preferably at most 50 times, and most preferably at most 25 times the thickness of the one outer metal layer or of the other outer metal layer, whichever has the larger thickness. A splice strap at one outer metal layer in this embodiment may cover both offset splice lines.

The stack may also comprise splice lines in one or more inner metal layers. A preferred offset distance in such embodiments may be larger than 100 times, more preferably larger than 50 times, and most preferably larger than 25 times the thickness of the one outer metal layer or of the other outer metal layer, whichever has the larger thickness.

The width of the first and second splice strap may then be chosen such that it does not interfere with the internal splice lines, preferably when the internal splice lines overlap.

The stack of the laminate may comprise any number of metal layers and adhesive layers, and for instance comprises a stack consisting of one metal layer and another metal layer with an adhesive layer in between. In an embodiment of the invention, at least one of the adhesive layers of the stack comprises reinforcing fibers forming a fiber-reinforced adhesive stack layer. The fibers reinforce the stack thereby improving the mechanical strength and/or the crack growth performance. In another embodiment of the invention, at least one of the adhesive layers of the splice straps comprises reinforcing fibers forming a fiber-reinforced adhesive splice strap layer. Preferably, an outer layer of at least one of the first and second splice straps, and more preferably of both the first and second splice straps, is a metal sheet.

In an embodiment of the invention, at least 30%, more preferred at least 50%, even more preferred at least 65%, even more preferred at least 75%, and most preferred at least 90% of the reinforcing fibers in the stack are oriented at an acute angle with the first or second planar direction, the acute angle being within the range of −45° and 45" with respect to the first or second planar direction, more preferably within the range of −30' and 30° with respect to the first or second planar direction, and most preferably within the range of −15° and 15° with respect to the first or second planar direction.

The thickness of the spliced metal layer(s) of the stack may be chosen within the thickness range usually encountered for metal sheets, and is typically limited to 5-10 mm, in accordance with generally accepted definitions of what constitutes a foil, a sheet and a plate. Preferred thicknesses are at least 0.3 mm, more preferably between 0.3 mm and 1.3 mm, even more preferably between 0.4 mm and 1.2 mm, and most preferably between 0.6 mm and 1.0 mm.

In an embodiment, the metal sheets of at least one of the outer metal layers of the stack comprise the thickest metal sheet in the stack.

In an embodiment, a splice strap layer most closely arranged to the outer surface of the stack extends over a total lateral distance of at least 25 times the thickest metal sheet in the stack, more preferably over a total lateral distance of at least 100 times the thickest metal sheet in the stack, in case the splice strap only covers one splice line. In an embodiment wherein a splice strap covers more than one substantially parallel outer splice line, the width of the splice strap and/or the lateral distance of the splice strap layer is at most 2000 times, more preferably at most 1500 times, and most preferably at most 1000 times the thickness of an outer metal layer and/or of the thickest metal sheet in the stack.

In an embodiment, at least one metal layer and/or at least one adhesive layer in a first and/or second splice strap is interrupted. In other useful embodiments, the width of a first splice strap may be the same or may differ from the width of a second splice strap. In an embodiment having one outer metal layer and another outer metal layer both provided with first and second splice straps, the splice straps provided on the one outer metal layer may have a different width than the splice straps provided on the other outer metal layer.

The first and second straps each may comprise a number of strap layers of equal width or of variable width, in case one layer represents the widest splice strap layer. In such an embodiment, strap layers of lesser width may be positioned closer to the stack's outer surface than the widest strap layer. The widest strap layer may thus be connected to the laminate at its sides only, for instance symmetrically with respect to its central extension. The widest splice strap layer is then connected to the laminate over a lateral distance of at least 5 times the widest strap layer thickness at both sides of the splice strap layer.

A preferred embodiment provides a laminate wherein the splice strap is attached to the outer surface of the stack by a fiber reinforced adhesive layer, of which an edge part is substantially free from reinforcing fibers, the edge part being defined as extending from an outer lateral edge of the splice strap over a lateral distance of at least 5 times the average thickness of the outer layer of the splice strap.

In case the splice strap comprises one layer only, the widest splice strap layer corresponds to this one strap layer. The strap may also comprise a number of strap layers of equal width. In this case, all the strap layers can be considered as the widest strap layer.

According to the invention, the splice strap or a widest splice strap layer is connected to the stack over a lateral distance of at least 10 times the widest strap layer thickness. In more preferred embodiments, a widest splice strap layer is connected to the laminate stack over a lateral distance of at least 25 times the widest strap layer thickness, even more preferred over at least 50 times the widest strap layer thickness, even more preferred over at least 80 times the widest strap layer thickness, even more preferred over at least 100 times the widest strap layer thickness, and most preferred over at least 200 times the widest strap layer thickness. Other preferred embodiments relate to a laminate, wherein the widest splice strap layer is connected to the stack over a lateral distance of at most 500 times the widest strap layer thickness, more preferably over at most 400 times the widest strap layer thickness, and most preferred over at most 300 times the widest strap layer thickness. In embodiments wherein a splice strap covers more than one substantially parallel outer splice line, the splice strap and/or a widest splice strap layer may be connected to the stack over a lateral distance of at least 1000 times, more preferably at least 1500 times, and most preferably at least 2000 times the strap or widest strap layer thickness.

A particularly useful embodiment offers a laminate wherein the layers of the first and/or second splice strap each have a width in the lateral direction of the strap across a splicing region, and the width of the layers decreases over the splice strap thickness towards the laminate stack to form staggered layers. In another embodiment, the splice strap layers each have a width in the lateral direction of the strap across a splicing region and the width of the layers increases over the splice strap thickness towards the stack to form staggered layers.

The splice strap layers of the first and/or the second splice strap may be staggered on one or both sides of the splice strap to provide a splice strap with staggered edges. In an embodiment of the invention, the laminate is characterized in that the splice strap layers are staggered on each side of the splice strap by a length of at least 5 times the widest strap layer thickness, and more preferably by a length of at least 10 times the widest strap layer thickness.

According to the invention, a laminate may be provided wherein an outer surface of the first and/or second splice strap protrudes from the outer surface of the stack by an non-flush thickness, for instance ranging from 0% to more than 100% of the splice strap thickness. In a preferred embodiment, the off-set thickness is 0 (zero), and the outer surface of the first and/or second splice strap is flush with the outer surface of the laminate. In such embodiment, the splice strap is embedded in the laminate stack and a substantially smooth outer surface of the laminate ensues. In embodiments having a non-zero off-set thickness, the splice strap protrudes from an outer surface of the laminate stack in the splicing regions and a discontinuous outer surface of the laminate ensues in the splicing regions.

Metal sheets having overlapping edge parts may be deformed locally and may produce a laminate wherein, in an embodiment, the outer surface of the laminate is substantially smooth and a second outer surface opposite said outer surface is curved. The outer surface is then typically used as outbound surface of an aircraft component for instance, whereas the curved second outer surface is used as inbound surface of the aircraft component. The inbound surface may typically be covered with interior cladding and the like.

The laminate according to the invention also provides good static properties, such as blunt notch strength. In an embodiment, the blunt notch strength of the laminate $P_{bn\ lam}$ is larger than 75% preferably larger than 90%, and more preferably larger than 100% of the blunt notch strength of the stack $P_{bn\ stack}$ wherein $P_{bn\ stack}$ is the blunt notch strength of the stack of the laminate without any splice.

The laminate stack according to the present invention preferably comprises from 0 to 100 metal layers and about 1 to 99 adhesive layers. The metal layers may have any thickness such as the relatively thin metal layers of the prior art spliced laminates. Metal sheet thicknesses of between 0.1 and 2 mm may be used. The metal sheets in the present invention preferably have a thickness of equal or more than 0.2 mm, more preferably equal or more than 0.3 mm, and most preferably equal or more than 0.6 mm.

The splice strap according to the invention preferably comprises from 0 to 8 metal layers and/or from 0 to 8 fiber-reinforced adhesive layers. The layers may have any thickness as long as the requirements of claim 1 are satisfied.

The metal sheets are preferably made from a metal having a tensile strength of more than 200 MPa. Examples of suitable metals are aluminum alloys, steel alloys, titanium alloys, copper alloys, magnesium alloys, and aluminum matrix composites. Aluminum-copper alloys of the AA2000 series, aluminum manganese alloys of the AA3000 series, aluminum-magnesium alloys of the AA5000 series, aluminum-zinc alloys of the AA7000 series, and aluminum-magnesium-silicon alloys of the AA6000 series are preferred. Some particularly preferred alloys are AA2024 aluminum-copper, AA5182 aluminum alloy, AA7075 aluminum-zinc, and AA6013 aluminum-magnesium-silicon. When improved corrosion resistance is desired, a sheet of AA5052 alloy or AA5024, AA5083 or AA5182 alloy may be included in the laminate. The laminates may also comprise metal sheets of a different alloy. Other useful alloys comprise aluminum-lithium alloys, such as AA2090, AA2098, and AA2198 alloys.

The adhesive layers of the laminate and/or splice strap are in preferred embodiments provided with reinforcing fibers, which fibers preferably bridge the splice lines and metal sheet edge overlaps and therefore are continuous across the splicing region. The reinforcing fibers may be oriented in one direction or in several different directions, depending on the loading conditions of the laminate structure. Preferred reinforcing fibers comprise continuous fibers made of glass, aromatic polyamides ("aramids"), carbon, basalt, and/or polymeric fibers such as PBO for instance. Preferred glass fibers include S-2, S-3 and/or R-glass fibers, as well as carbonized silicate glass fibers, although E-glass fibers are also suitable. Preferred fibers have a modulus of elasticity of between 60 and 650 GPa, and an elongation at break of between 0.1 and 8%, preferably above 1.6%, more preferably above 2.0%, and most preferably above 3.0%

The adhesive layers preferably comprise synthetic polymers. Suitable examples of thermosetting polymers include epoxy resins, unsaturated polyester resins, vinyl ester resins, and phenolic resins. Suitable thermoplastic polymers include polyarylates (PAR), polysulphones (PSO), polyether sulphones (PES), polyether imides (PEI), polyphenylene ethers (PEE), polyphenylene sulphide (PPS), polyamide-4,6, polyketone sulphide (PKS), polyether ketones (PEK), polyether ether ketone (PEEK), polyether ketoneketone (PEKK), and others. The laminate and/or splice strap may be provided with additional adhesive in certain areas, apart from the adhesive present in the adhesive layers. The thickness of the adhesive layers may be similar to that of the metal sheets but adhesive layers in the laminate and/or splice strap are preferably thinner.

The reinforcing fibers in the laminate and/or splice strap layers may be provided in the form of prepregs, an intermediate product of reinforcing fibers embedded in a partly cured thermosetting resin or in a thermoplastic polymer. Typically fiber volume fractions range from 15 to 75%, and more preferably from 20 to 65% of the total volume of adhesive and reinforcing fiber in the adhesive layers. The effective fiber volume fraction in an adhesive layer may be lowered by adding plain adhesive layers to reinforced adhesive layers.

The laminate in accordance with the invention may be manufactured by a method that comprises the steps of providing a forming substrate with an upper surface; providing a first splice strap according to claim 1 on the upper surface of the forming substrate, the splice strap extending over part of the forming substrate in a first direction across a first splicing region; providing a second splice strap according to claim 1 on the upper surface of the forming substrate, the second splice strap extending over part of the forming substrate in a second direction different from the first direction across a second splicing region; providing a stack of at least one adhesive layer and metal sheets, of which edges extend along the first and the second planar direction and abut and/or overlap within the splicing regions, the stack extending beyond the boundaries of the first and second splice straps; and applying heat and pressure to form the laminate.

Metal sheets may deform across the splicing region during the application of heat and pressure, and the deformed shape may be consolidated. The shape may be consolidated by curing the thermosetting resin in the adhesive layers, or by lowering the temperature below the melt temperature of a thermoplastic polymer in case such polymer is used in the adhesive layers. The metal sheets will typically bend towards any one of the splice straps. The metal sheets may be deformed elastically (below the elastic limit) and/or may be deformed plastically (beyond the plastic limit). Which type of deformation prevails depends on the type of metal used, on shape and dimensions, and on manufacturing conditions.

Another aspect of the invention finally relates to a structural component for a vehicle, spacecraft, or aircraft, comprising a laminate according to one of the described embodiments, and in particular to a wing or a fuselage of an aircraft, wherein the first planar direction is arranged substantially parallel to a longitudinal direction of the wing or the fuselage.

BRIEF DESCRIPTION OF THE FIGURES

The invention will now be further elucidated on the basis of the exemplary embodiments shown in the figures, without however being limited thereto. The same or similar elements in the figures may be denoted by the same or similar reference signs. In the figures.

DETAILED DESCRIPTION OF EXEMPLARY EMBODIMENTS

Figure 9:
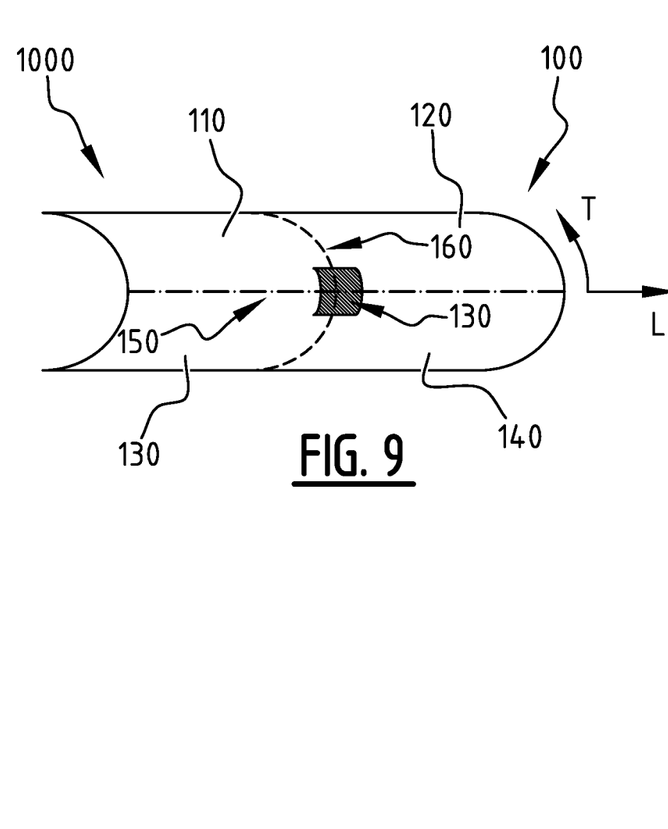
FIG. 9 shows in a perspective view a fuselage panel including a laminate according to the present invention.

FIG. 9 show an example of a fuselage panel comprising a laminate according to the present invention. FIG. 9 shows the fuselage panel including the laminate in a perspective view along a longitudinal direction L and a transverse direction T, which is a curved direction along the curvature of the laminate. The laminate comprises a stack of mutually bonded adhesive layers and metal layers wherein an outer metal layer 100 defines an outer surface of the stack. The outer metal layer 100 comprises four metal sheets 110, 120, 130 and 140. The four metal sheets 110 to 140 define a first splice line 150 extending along the longitudinal direction L and a second splice line 160 extending along the transverse direction T. The first splice line and the second splice line 150, 160 intersect one another under an angle α in a common splicing region 170. The laminate can be any of the embodiments of the laminates described in relation to FIGS. 1A-8 herein below. The laminate according to the invention provides a simple way of providing a larger laminate based on metal sheets having crossed splice lines at the outer metal layer.

Figure 1A:
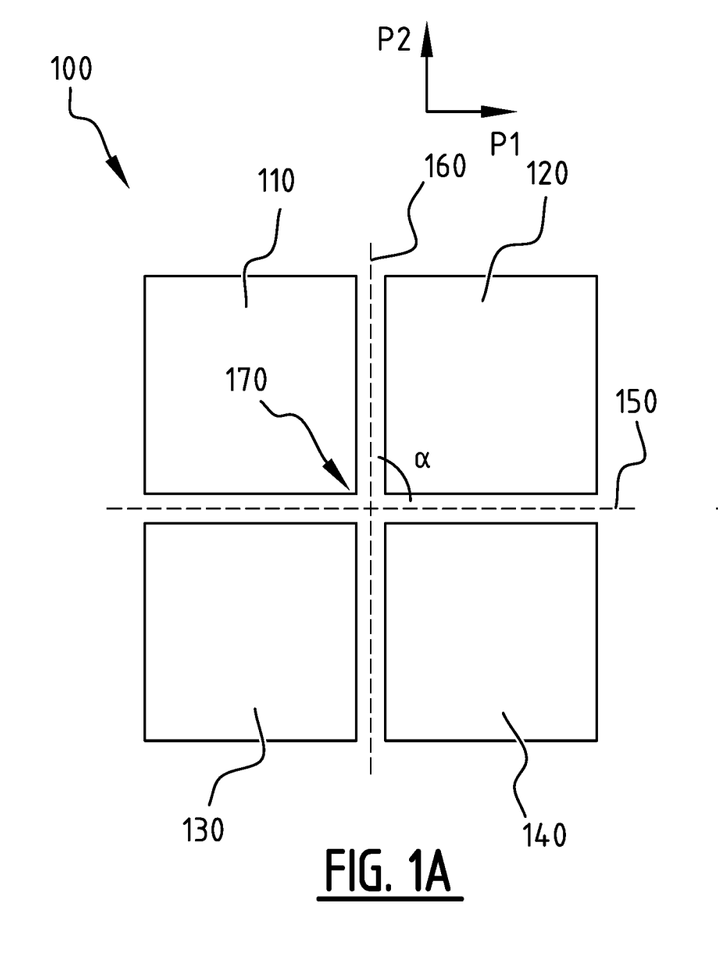
FIG. 1A shows in a plane view a first embodiment of the laminate according to the present invention.
Figure 1B:
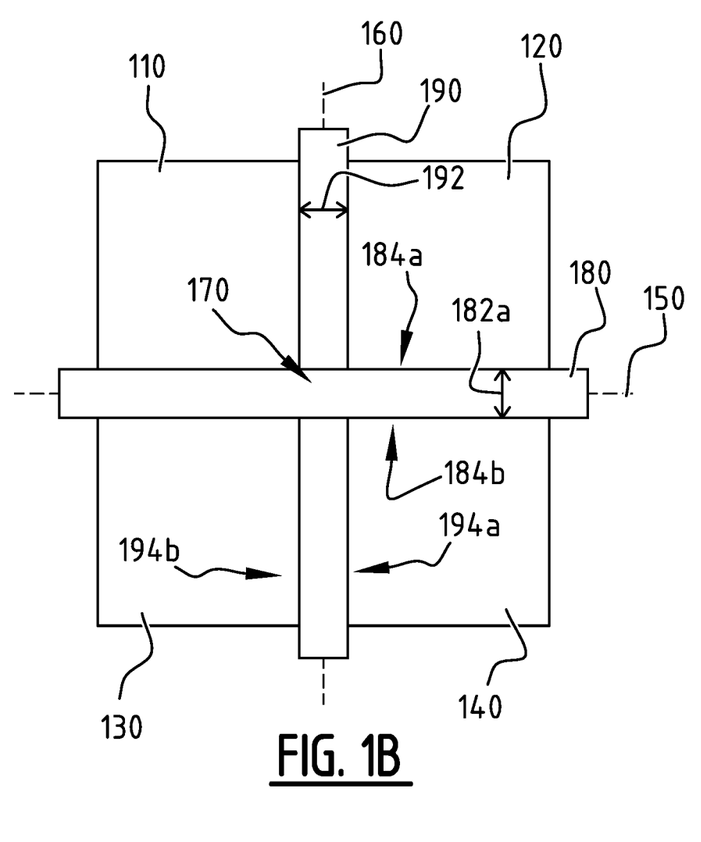
FIG. 1B shows the first embodiment including the splice straps.

FIGS. 1A and 1B show a first embodiment of a part of a laminate according to the present invention. FIG. 1A shows the laminate in a plane view along a first and second planar direction P1 and P2. The laminate 100 comprises a stack of mutually bonded adhesive layers and metal layers wherein an outer metal layer 100 defines an outer surface of the stack. Only parts of the outer layers are shown. The outer metal layer 100 comprises four metal sheets 110, 120, 130 and 140. The metal sheets 110-140 have abutting metal sheet edges extending in the first planar direction P1 and the second planar direction P2. In the FIGS. 1A and 1B only the outer metal layer 100 of the stack has been shown. The four metal sheets 110 to 140 define a first splice line 150 extending along the first planar direction P1 and a second splice line 160 extending along the second planar direction P2. The first splice line and the second splice line 150, 160 intersect one another under an angle α in a common splicing region 170. The angle α shown in this embodiment is substantially 90°. In alternative embodiments the angle α may lie between 45° and 95°.

Now referring to FIG. 1B the laminate further comprises a first splice strap 180 which is connected to the outer surface of the outer metal layer 100 and covers the first splice line 150 over a first splice strap lateral with 182*a*. Furthermore a second splice strap 190 is connected to the same outer surface of the outer metal layer 100 and covers the second splice line 160 over a second splice strap lateral with 192. Each of the first and the second splice straps 180 and 190 comprise a stack of at least one metal layer and/or an adhesive layer which comprising fibres. The stack is bonded to at least one adhesive layer for connection to the outer metal layer 100 of the stack of the laminate. The first splice strap 180 has lateral edge parts 184*a* and 184*b* which extend along the first planar direction P1. The second splice strap 190 has lateral edge parts 194*a* and 194*b* extending along the second planar direction P2. The lateral edge parts 184*a*, 184*b*, 194*a*, 194*b* are defined as extending from the outer lateral edge of a splice strap 190 and 180 over a lateral distance of at least five times the edge part average thickness. Herein, a lateral distance is defined as being perpendicular to the first and second planar direction P1, P2 of the first and second splice line 150, 160, respectively. The bending stiffness in the lateral width direction of a lateral edge part 184*a*, 184*b*, 194, 194*b* of each splice strap 180 and 190 is less than the bending stiffness of the outer metal layer sheets 110-140 of the outer metal layer 100. In the embodiment shown the first splice strap 180 covers the common splicing region 170 and the second splice strap 190 is interrupted in the common splicing region 170. Alternatively, the first and the second splice straps 180 and 190 overlap the common splicing region 170 to both cover the common splicing region.

Figure 2A:
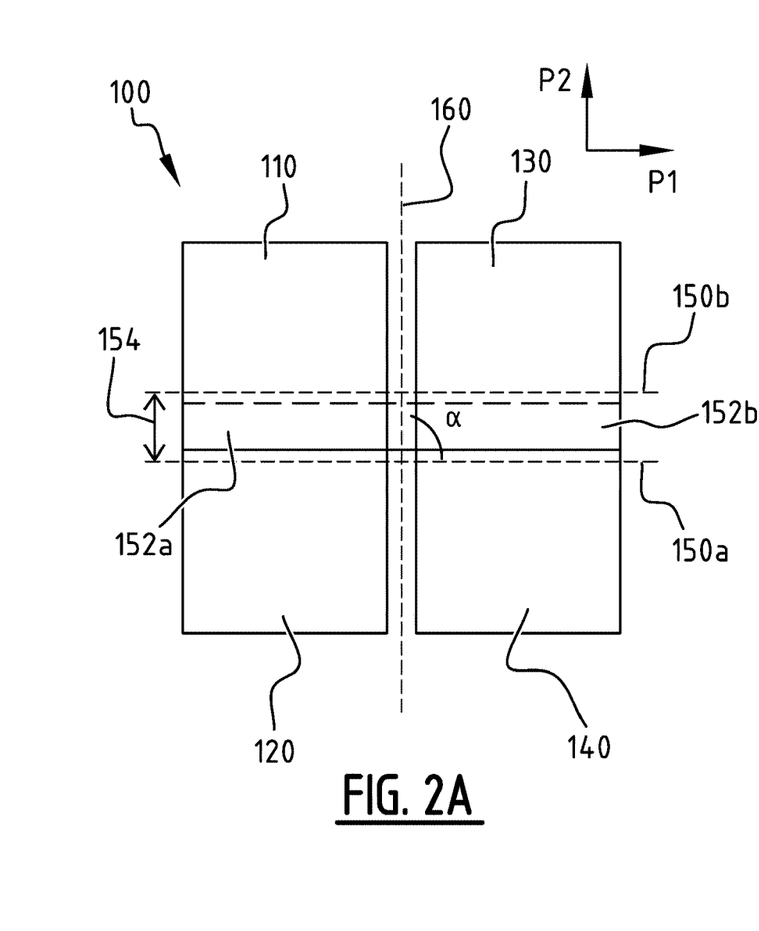
FIG. 2A shows in a plane view a second embodiment of the laminate according to the present invention.
Figure 2B:
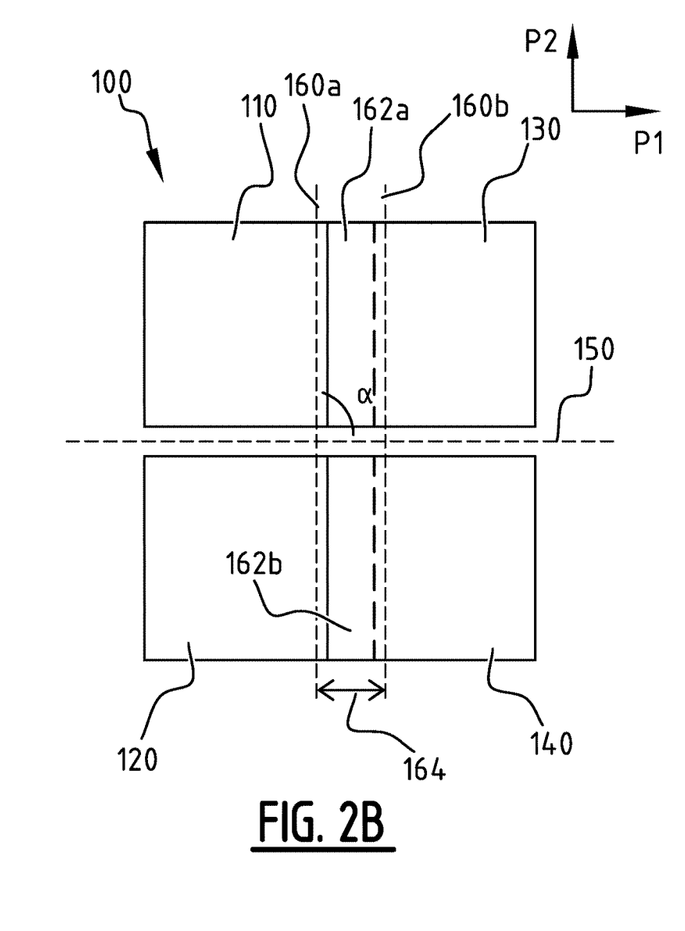
FIG. 2B shows in a plane view a third embodiment of the laminate according to the present invention.

FIGS. 2A and 2B show a second and a third embodiment of the laminate according to the present invention. FIG. 2A shows the second embodiment in a planar view along a first planar direction P1 and a second planar direction P2. The laminate comprises a stack of mutually bonded adhesive layers and metal layers wherein an outer metal layer 100 is shown. The outer metal layer 100 defines an outer surface of the stack. The outer metal layer 100 comprises four metal sheets 110, 120, 130 and 140. The metal sheets 110 and 120 have overlapping end parts 152*a* within a splicing region 154 between a pair of first splice lines 150*a*, 150*b*, being arranged parallel to one another in the first planar direction P1. Likewise metal sheets 130 and 140 have also overlapping end parts 152*b* within the splicing region 154 between a pair of parallel first splice lines 150*a*, 150*b* being arranged parallel to one another in the first planar direction P1. Furthermore, the metal sheets 110, 120 have abutting metal sheet edges in contact or close to the metal sheets 130, 140, thereby defining a second splice line 160 which extends in the second planar direction P2 of the laminate.

Now referring to FIG. 2B, this figure shows the third embodiment which is a modified embodiment with respect to the embodiment shown in 2A. The metal sheets 110, 130 have overlapping end parts 162*a* within a splicing region 164 between a pair of second splice lines 160*a*, 160*b*, being arranged parallel to one another in the second planar direction P2. Also the metal sheets 120, 140 have overlapping end parts 162*b* within the splicing region 164 between the pair of second splice lines 160*a*, 160*b*. The second splice lines 160*a*, 160*b* extend along the second planar direction P2. Furthermore, metal sheets 110 and 130 have abutting sheet edges to the metal sheets 120 and 140 respectively thereby defining the first splice line 150. The first splice line 150 extends along the first planar direction P1. The overlapping end parts as shown in FIG. 2A and FIG. 2B extend over a first and second splice region 154 and 164 respectively, wherein the splice lines 150*a*, 150*b*, 160*a*, 160*b* substantially coincide with edges of the metal sheets 110-140 at the overlapping end parts. In the embodiments of FIG. 2A and FIG. 2B respectively furthermore a first splice strap and a second splice strap are connected to the outer surface of the outer metal layer 100. These first and second splice straps are not shown in these figures. The first splice strap covers the first splice line 150 over a first spliced strap lateral width and the second splice strap covers the second splice line 160 over a second splice strap lateral width. Both the first and second splice straps comprise at least one metal layer and/or at least one adhesive layer comprising fibres.

In FIGS. 2A and 2B the first splice line 150 and the second splice line 160 intersect one another under an angle α which is substantially 90° these embodiments. In alternative embodiments the angle α may lie between 45° and 95°.

Figure 3:
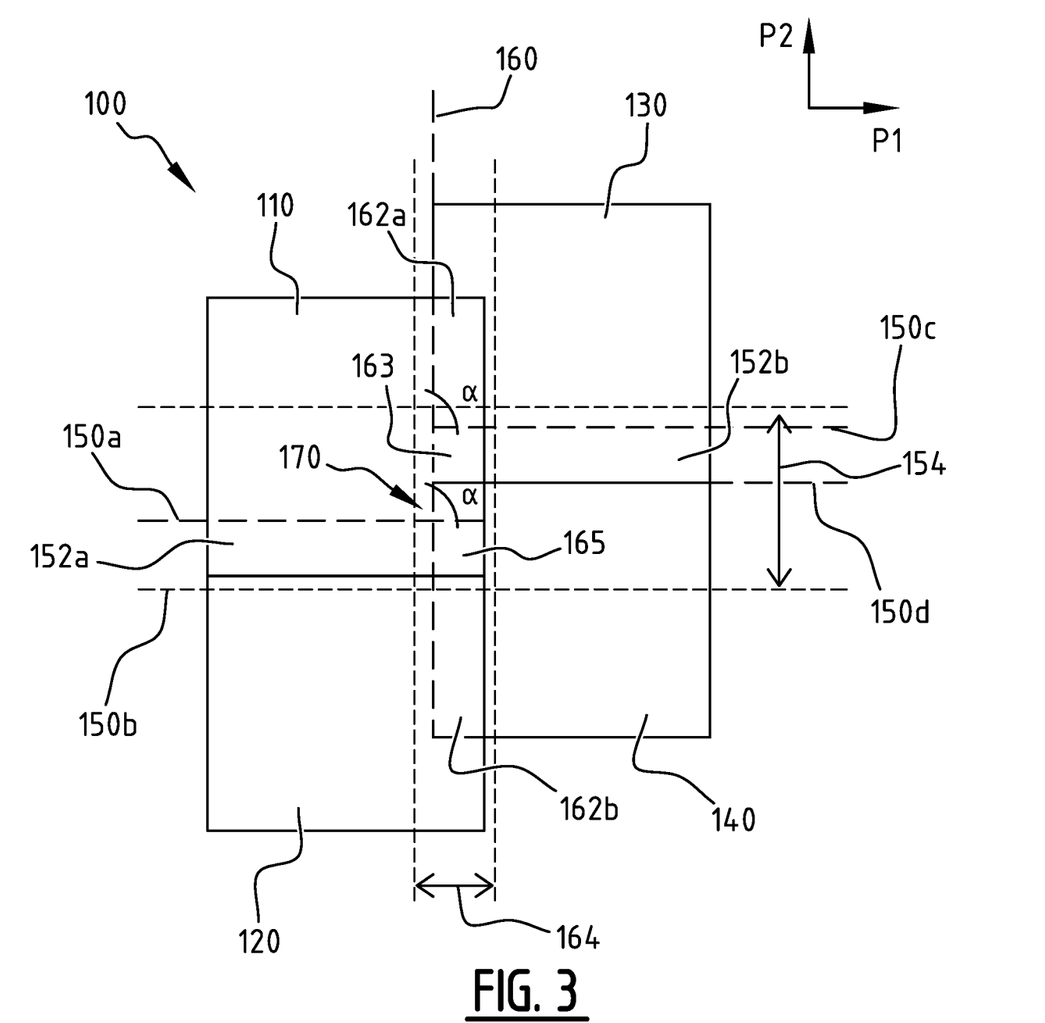
FIG. 3 shows in a plane view a fourth embodiment of the laminate according to the present invention.

FIG. 3 shows a fourth embodiment of the laminate according to the present invention. The fourth embodiment of FIG. 3 is a modified embodiment of the second embodiment shown in FIG. 2A. The laminate comprises the outer metal layer 100 defining an outer surface of the stack, which comprises four metal sheets 110-140. The metal sheets 110 and 120 have overlapping end parts 152A within a splice region between a pair of first splice lines 150*a*, 150*b*. The metal sheets 130 and 140 have overlapping end parts 152B within a splice region between a pair of other first splice lines 150*c*, 150*d*. All first splice lines 150*a*, 150*b*, 150*c*, 150*d* extend along a first direction P1. The splice region of metal sheets 110, 120 have an offset with the splice region of metal sheets 130. 140 in the lateral direction perpendicular to the first planar direction P1 as shown in FIG. 3. Furthermore, metal sheets 110, 120 have overlapping end parts to the metal sheets 130, 140, respectively as shown in FIG. 3 within a splice region between a pair of second splice lines 160*a*, 160*b*. The second splice lines 160*a*, 160*b* extend in a second planar direction P2. The second splice lines 160*a*, 160*b* intersects both the first splice line 150*a*, 150*b* and the other first slice line 150*c*, 150*d* at an angle α which is in this embodiment substantially 90° for both intersections. The overlapping end parts 162A and 162E extend in a lateral direction to the second planar direction P2. The overlapping end parts 152A and 152B extend in a lateral direction perpendicular to the first planar direction P1 and in combination cover a lateral width 154 as shown in this configuration due to the offset between one another in the lateral direction. The overlapping end parts of the metal sheets 110, 120, 130 and 140 have a critical location at 163 and 165. In these locations 163, 165 the overlapping end parts form a stack of three layers on top of each other. In the location 163 the overlapping end parts is formed by metal sheet 110, 130 and 140. At the critical location 165 the overlapping end parts is formed by metal sheet 110, metal sheet 120 and metal sheet 140. So at these locations 163 and 165 the total thickness of the metal layer is the sum of the three metal sheets and the adhesive in between. Thus, these locations have the maximum thickness increase of three metal sheets with the associated adhesive layer. Furthermore at location 163 the metal sheet 110 has severe double curve bending which may occur in autoclave bonding operation. Furthermore, a first splice strap and a second slice strap may be bonded to the outer surface of the outer layer 100 to cover both the first splice line 150A and other first splice line 150B and to cover the second splice line 160. The first splice strap extends along a lateral distance 154 and the second splice strap extends along a lateral distance 164. Herein, a lateral distance 154, 164 is defined as being perpendicular to the first and second planar direction P1, P2 of the first and second splice line 150, 160, respectively. The first and second splice straps cover a common splicing region 170 which includes the critical location 163 and 165. The first splice strap may cover the common splicing region 170 and the second splice strap may be interrupted at the common splicing region 170.

Figure 4A:
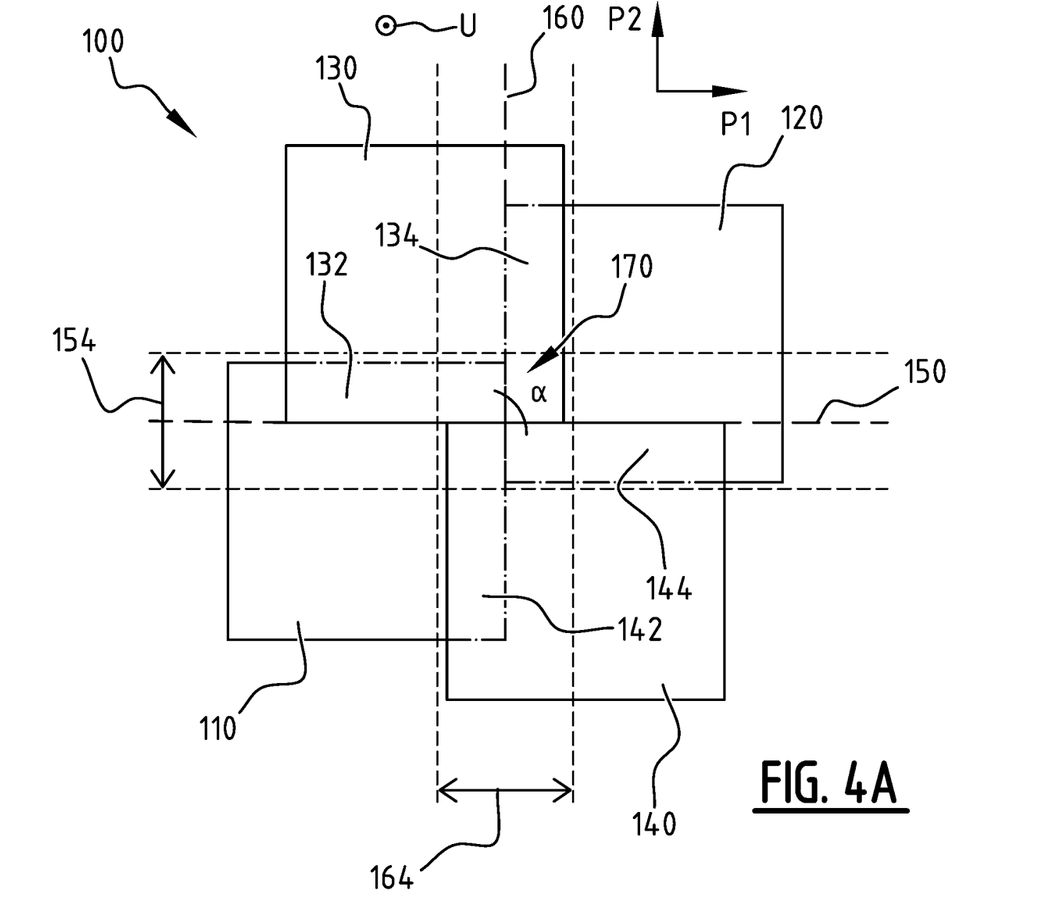
FIG. 4A shows in a plane view a fifth embodiment of the laminate according to the present invention.
Figure 4B:
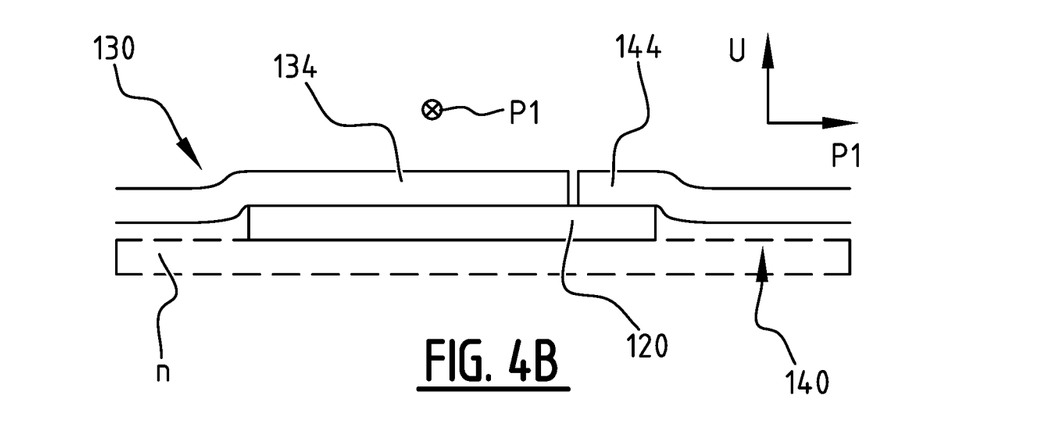
FIG. 4B shows a cross section of the outer metal layer of the laminate shown in FIG. 4A along the second splice line.

Reference is now made to FIGS. 4A and 4B which show a fifth embodiment of the laminate according to the present invention. The laminate of the fifth embodiment shown has a stack of mutually bonded metal sheets and adhesive layers and comprises an outer metal layer 100 which is shown in FIG. 4A. The outer metal layer 100 defines an outer surface and comprises four metal sheets 110, 120, 130 and 140 which are arranged for having overlapping end parts between one another. The metal sheets 110 and 120 are arranged having abutted sheet edges along a second splice line 160 which extends along a second planar direction P2. The metal sheets 130 and 140 have abutted sheet edges along a first splice line 150 which extends along a first planar direction P1. The first planar direction P1 and second planar direction P2 are arranged having an angle α between one another. The first splice line 150 and the second splice line 160 intersect one another within a common splicing region 170 and are arranged at an angle α between one another. The metal sheet 130 has overlapping end parts 132 and 134 with the metal sheet 110 and 120 respectively. The metal sheet 140 has overlapping end parts 142 and 144 with the metal sheet 110 and the metal sheet 120 respectively. In this way a first splicing region 154 is defined along the first splice line 150. The first splicing region 154 extends in a lateral direction over a first lateral splicing width 154. Furthermore in this way a second splicing region 164 is defined extending along the second splice line 160. The second splicing region 164 extends along a lateral direction over a second splicing width 164. This combination and arrangement of four metal sheets 110 140 can easily be produced by placing metal sheets 110 and 120 on a bonding tool and on top of these place metal sheet 130 and 140 which have abutting metal sheet edges and adhesive in areas 132, 134, 142 and 144. Furthermore, a first splice strap and a second splice strap are connected to the outer surface of the outer metal layer 100. The first splice strap covers the first splice line 150 over a first splice strap lateral width. The second splice strap is connected to the outer surface and covers the second splice line 160 over a second splice strap lateral width. The first splice strap lateral width in a direction perpendicular to the first planar direction P1 is at least the same as the first splicing width 154. Preferably the first splice strap lateral width is such that the first splice strap protrudes from the first splicing region 154 in a direction perpendicular to the first planar direction P1 over a lateral distance of at least 5 times the thickness of the outer metal layer 100 of the metal sheets 110-140. The second splice strap lateral width in a direction perpendicular to the second planar direction P2 is at least the same as the second splice width 164. Preferably the second splice strap lateral width is such that the second splice strap protrudes from the first splicing region 154 in a direction perpendicular to the second planar direction P2 over a lateral distance of at least 5 times the thickness of the outer metal layer 100 of the metal sheets 110-140.

Now referring to FIG. 4B, which shows a cross section of the outer metal layer 100 along the second splice line 160 as viewed in the direction P1. As shown in FIG. 4B, in the embodiment overlapping end parts 134, 144 of the metal sheet 130 and 140 are arranged at the same side of the stack relative to the overlapping end parts of the metal sheets 110 and 120. Beneath the outer metal layer 100. relative to the upper direction U, other layers are arranged in the stack of the laminate. For indicative purposes, only one other layer n of the stack is shown in the cross section of FIG. 4B. In FIG. 4A the first splice line 150 and the second splice line 160 intersect one another under an angle α which is substantially 90° these embodiments. In alternative embodiments the angle α may lie between 45° and 95°.

The fifth embodiment shown in FIGS. 4A and 4B has the advantage relative to the embodiment shown in FIG. 3, that the overlapping end parts 132, 134, 142, 144 of the outer metal layer 100 only has 2 metal sheets on top of each other, including adhesives in between, instead of 3 metal sheets on top of each other, including adhesives in between (see critical areas 163 and 165 shown in FIG. 3).

Figure 5A:
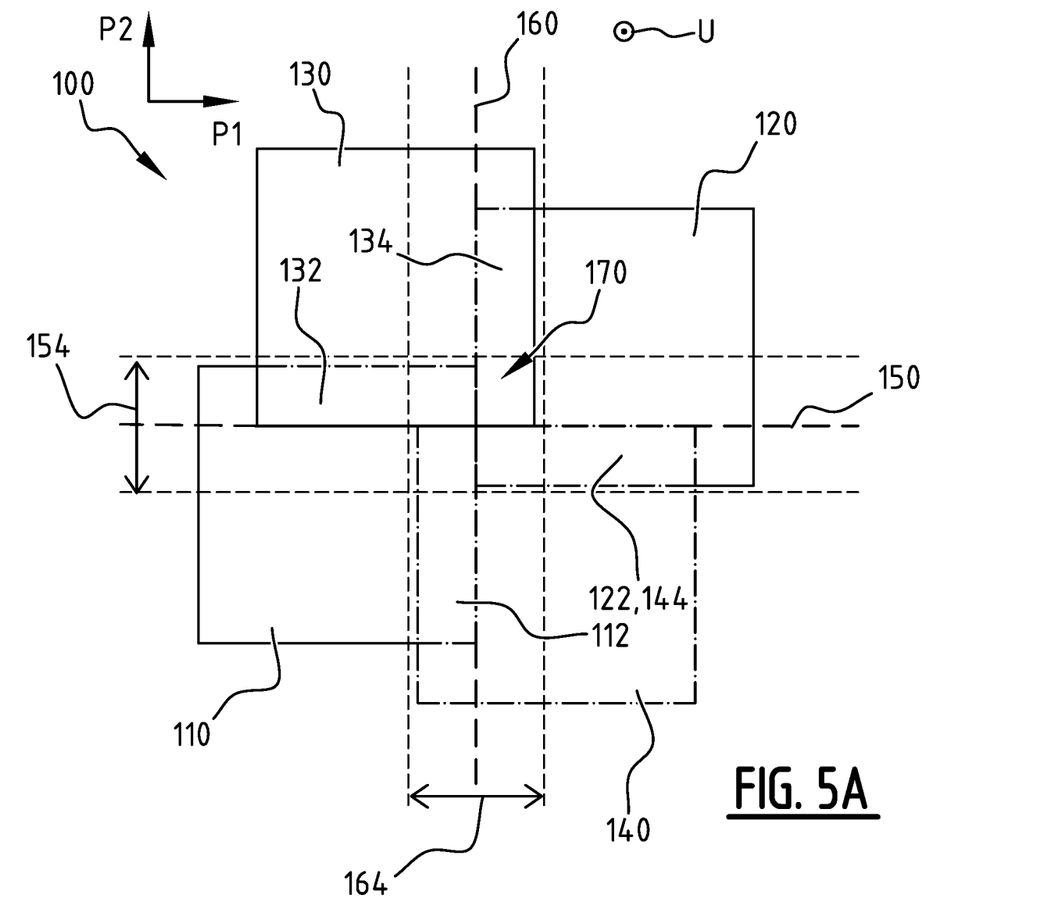
FIG. 5A shows in a plane view a sixth embodiment of the laminate according to the present invention.
Figure 5B:
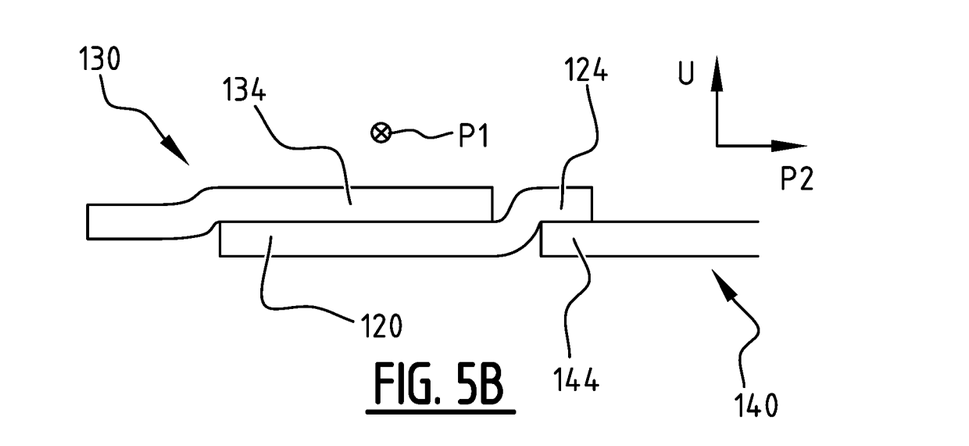
FIG. 5B shows a cross section of the outer metal layer of the laminate shown in FIG. 5A along the second splice line.

FIGS. 5A and 5B show a sixth embodiment of the laminate according to the present invention. The sixth embodiment is a modified embodiment of the fifth embodiment shown in FIGS. 4A and 4B. The other metal sheet 140 is placed first. The metal sheet 110 and metal sheet 120 are placed having overlapping end parts 112 and 124, respectively, with the metal sheet 140. Furthermore metal sheet 130 is placed having overlapping end parts 132 and 134 with the metal sheet 110 and metal sheet 120 respectively. The overlapping end parts 132 and 134 are arranged on top of the overlapping end parts of the metal sheets 110 and 120, respectively. The overlapping end parts 112 and 124 of metal sheet 110 and metal sheet 120 are arranged on top of the metal sheet 140. In this way the metal sheet 130 and 140 have metal sheet edges within the first splicing region, which are arranged substantially coinciding with each other along the first planar direction P1 in the plane of the stack 100.

Now referring to FIG. 5B, which shows a cross section of the outer metal layer 100 along the second splice line 160 as viewed in the direction P1. As shown in cross section view of FIG. 5B, the overlapping end part 134 of the metal sheet 130 is arranged at an upper side of metal sheet 120, in the upper direction U. Furthermore, the overlapping end part 124 of the metal sheet 120 is arranged at an upper side of metal sheet 140, in the upper direction U. In this way, the overlapping end parts 134, 144 of the metal sheets 130, 140 respectively are arranged opposite to one another relative to the metal sheet 120. This configuration is largely the same as the previous one. It has only less manufacturing ease and is also more complex due to the lay up sequence. This embodiment also has a first splice strap and a second splice strap as described for the embodiment shown in FIGS. 4A and 4B.

The embodiment shown in FIGS. 5A and 5B has the advantage relative to the embodiment shown in FIG. 3, that the overlapping end parts 132, 134, 142, 144 of the outer metal layer 100 only has 2 metal sheets on top of each other, including adhesives in between, instead of 3 metal sheets on top of each other, including adhesives in between (see critical areas 163 and 165 shown in FIG. 3).

Figure 6:
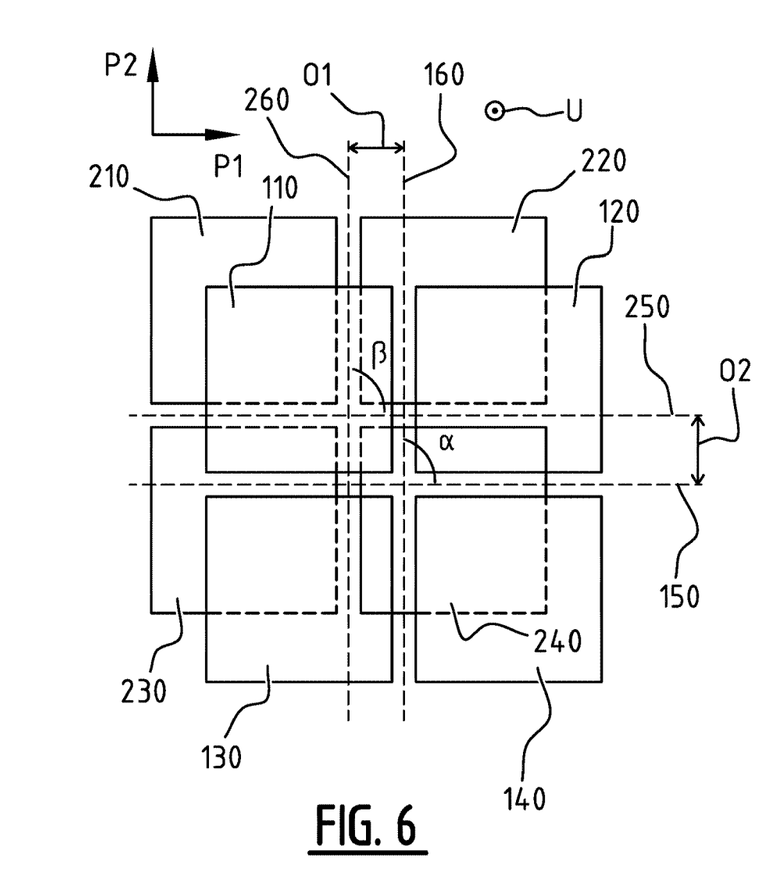
FIG. 6 shows in a plane view a seventh embodiment of the laminate according to the present invention.

Now referring to FIG. 6 which shows a seventh embodiment of the laminate according to the present invention. The seventh embodiment comprises two of the outer metal layers 100 as shown in the first embodiment shown in FIGS. 1A and 1B. The outer metal layer 100 comprises four metal sheets 110, 120, 130 and 140 which have abutting edges defining a first splice line 150 and a second splice line 160 which intersect one another under an angle α. The first metal layer 100 is located at one side of the stack and the second metal layer 200 is located at another side of the stack opposite to the first side. The second metal layer 200 comprises four metal sheets 210, 220, 230 and 240. The metal sheets have abutted edges thereby defining a first splice line 250 and a second splice line 260. The first splice line 250 and the second splice line 260 intersect one another within a common splicing region at an angle α, β. The first metal layer 100 and the second outer metal layer 200 are each provided with a first and second splice strap, which are shown in FIG. 1B. The first and second planar direction P1, P2 of the first outer metal layer 100 and the second outer metal layer 200 are substantially parallel to one another. The splice lines 150, 160 of the first metal layer 100 and the splice lines 250, 260 of the second metal layer 200 are offset with respect to each other over an offset distance in the plane of the stack. The offset distance in the first planar direction O1 is substantially equal to the offset distance O2 in the second planar direction P2. The offset distance in the first and/or second planar direction P1, P2 is at least equal to 5 times the thickness of the first metal layer 100 or of the second metal layer 200 whichever has the larger thickness.

More preferably the offset distance O1, O2 is at least 10 times the thickness of the first metal layer or of the second metal layer 200 whichever has the larger thickness. The offset distance O1 and O2 and the splice strap lateral width of the first and second splice straps of both the outer metal layer and the other outer metal layer are selected such that the first and second splice straps do not cover each other in the plane of the stack. The bottom straps can have different width compared to the top straps.

Figure 7A:
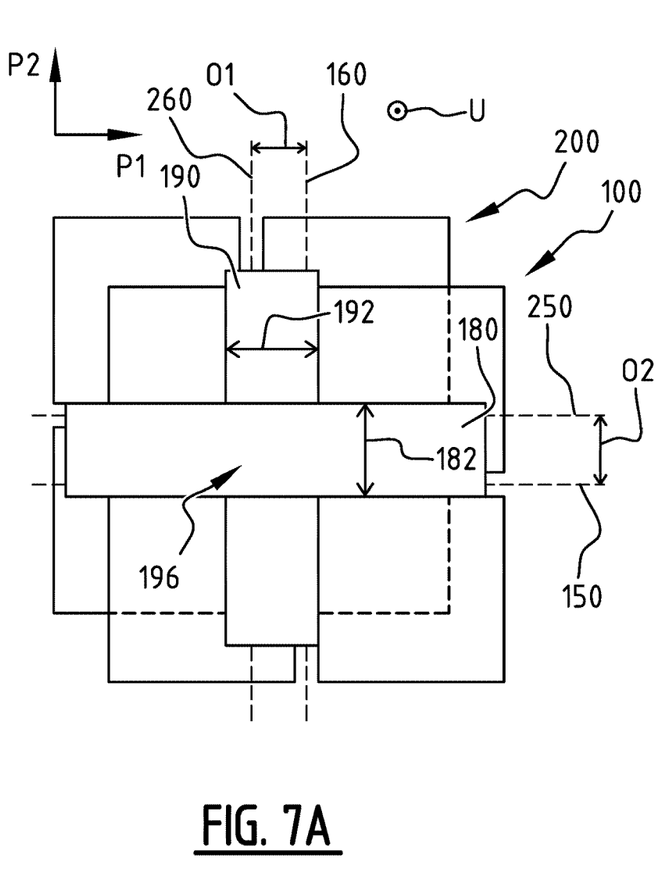
FIG. 7A shows in a plane view an eighth embodiment of the laminate according to the present invention.
Figure 7B:
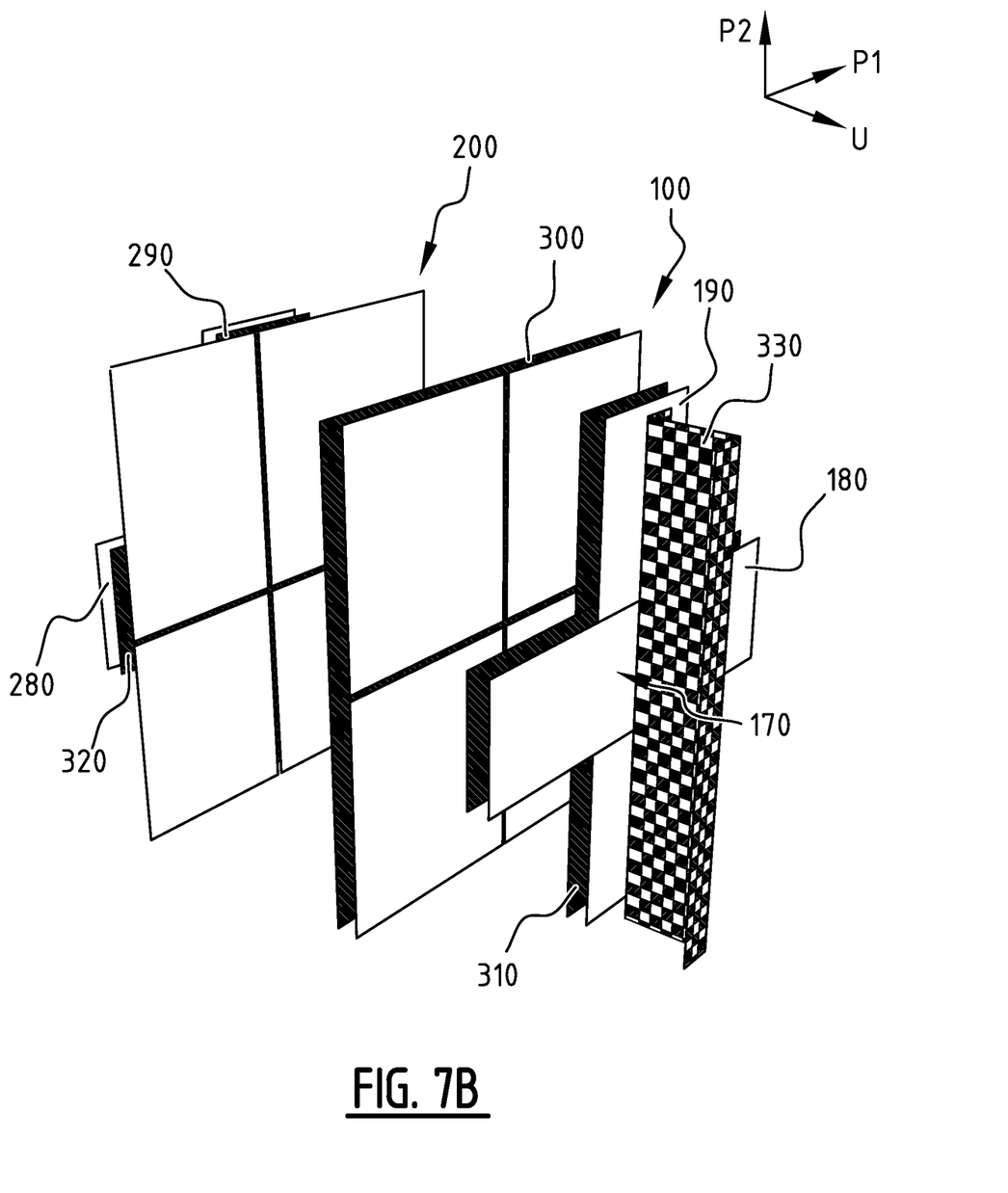
FIG. 7B shows in a perspective view the eighth embodiment of the laminate according to the present invention including a stringer.

Now referring to FIGS. 7A and 7B which show an eighth embodiment of the laminate according to the present invention. The embodiment shown in FIGS. 7A and 7B is a modified embodiment compared to the seventh embodiment shown in FIG. 6. FIG. 7A shows the laminate in a plane view along a first and second planar direction P1 and P2. FIG. 7B shows the laminate in a perspective view. In FIG. 7A the first outer layer 100 and second outer layer 200 have four metal sheets having abutted sheet edges along its first and second planar direction P1 and P2 thereby defining a first splice line 150 and 250 and second splice line 160 and 260, respectively. The splice lines 160, 260 have an offset in the first planar direction over an offset distance O1 and the splice lines 150, 250 have an offset in a second planar direction over an offset distance O2. Furthermore, a first splice strap and a second splice strap 180 and 190 are connected to an outer surface of the first metal layer 100. The first splice strap 180 has a first splice strap lateral width 182 which covers both the splice lines 150 and 250. Preferably the first splice strap lateral width 182 is such that the first splice strap protrudes from the splicing region in a direction perpendicular to the first planar direction P1 over a lateral distance of at least 5 times the thickness of the outer metal layer 100 of the metal sheets 110-140.

Furthermore, the second splice strap 190 has a second splice strap lateral width 192 and covers both the second splice line 160 and the other second splice line 260. Preferably the second splice strap lateral width 192 is such that the second splice strap protrudes from the splicing region in a direction perpendicular to the second planar direction P2 over a lateral distance of at least 5 times the thickness of the outer metal layer 100 of the metal sheets 110-140.

In this way, the combination of the first splice strap 180 and the second splice strap 190 connected to the first outer metal layer 100 provides fastening for both the outer metal layers 100 and 200. The first splice strap 180 covers the common splice region 196. The second splice strap 190 is interrupted in the common splicing region 196. Alternatively, the second and the first splice straps 180 and 190 overlap in this common splicing region 196 to both cover the common splicing region.

Now referring to FIG. 7B, which shows a perspective view of the laminate shown in FIG. 7A. For simplicity only the first outer layer 100, the second outer layer 200 of the stack are shown including an adhesive layer 300, which is arranged in the stack. It is clear to the skilled person than any number of layers of metal sheets and/or adhesive layers, such as adhesive layers comprising reinforcing fibers, may be arranged in the stack between the first outer layer 100 and the second outer layer 200. Furthermore, in FIG. 7B is shown the first splice strap 180 and the second splice strap 190 connected to the first outer metal layer 100 by an adhesive layer 310 and the other first splice strap 280 and the other second splice strap 290, which are connected to the second outer metal layer 200 by an adhesive layer 320. Furthermore, a stringer 330 is connected to the first splice strap 180 and the second, interrupted, splice strap 190 and extends along the second splice line 160 covering the common splice region 170. In this way, the interrupted second splice strap 190, which is interrupted at the common splicing region 170, is reliably connected to the first splice strap 180 at the common splicing region 170. The stringer is connected to the first and second slice strap by an adhesive layer with or without fibres, which are running in a stringer longitudinal direction.

Figure 8:
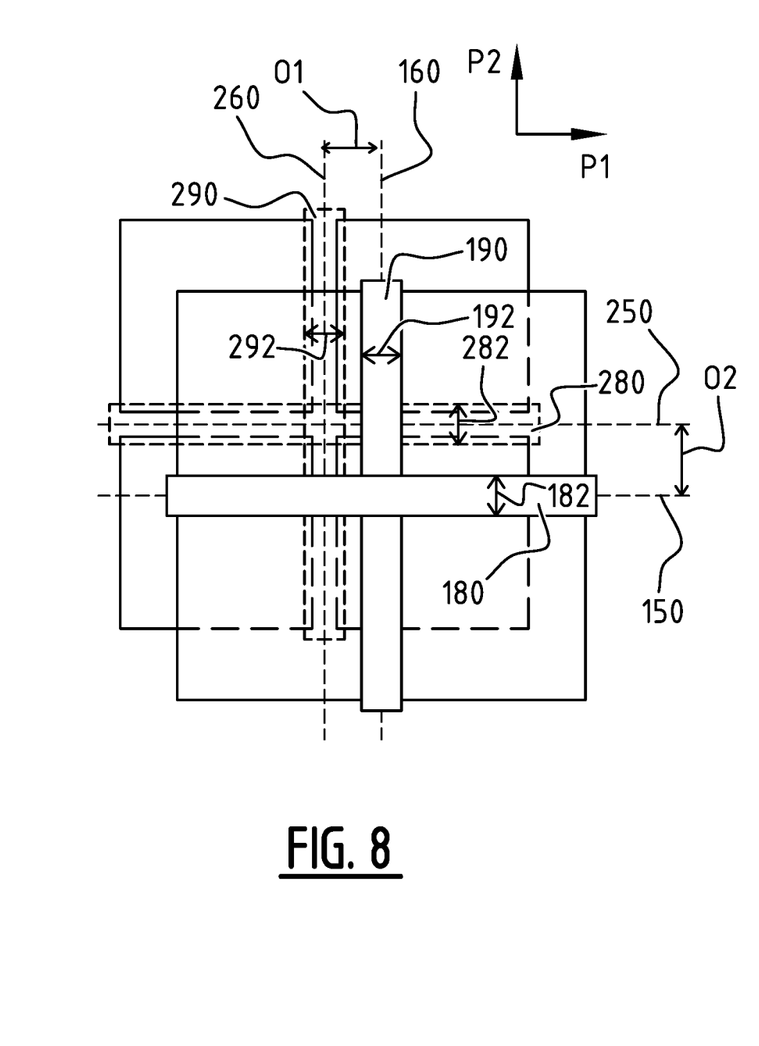
FIG. 8 shows in a plane view a ninth embodiment of the laminate according to the present invention.

Now referring to FIG. 8 which shows a ninth embodiment of the laminate according to the present invention. The embodiment shown in FIG. 8 is a modified embodiment compared to the eighth embodiment shown in FIG. 7. In FIG. 7 the first outer layer 100 and second outer layer 200 have four metal sheets having abutted sheet edges along its first and second planar direction P1 and P2 thereby defining a first splice line 150 and 250 and second splice line 160 and 260, respectively. The splice lines 160, 260 have an offset between one another in the first planar direction P1 over an offset distance O1 and the splice lines 150, 150 have an offset between one another in a second planar direction P2 over an offset distance O2. Furthermore, a first splice strap and a second splice strap 180 and 190 are connected to an outer surface of the first metal layer 100. Another first splice strap and a second splice strap 280 and 290 are connected to an outer surface of the other outer metal layer 200.

The offset distance O1, O2 in the first and/or second planar direction P1, P2 is at least equal to 5 times the thickness of the first metal layer 100 or of the second metal layer 200 whichever has the larger thickness.

More preferably the offset distance O1, O2 is at least 10 times the thickness of the first metal layer or of the second metal layer 200 whichever has the larger thickness. The offset distance O1 and O2 and the splice strap lateral width 182, 282, 192, 292 of the first and second splice straps of both the outer metal layer 100 and the other outer metal layer 200 are selected such that the first splice straps 180, 280 do not cover each other in the plane of the stack and the second splice straps 190, 290 do not cover each other in the plane of the stack. The bottom straps 280, 290 can have different width compared to the top straps 180, 190.

In all of the embodiments shown in FIGS. 1A-8B, the layers of each splice strap 180, 280 and 190, 290 is selected such that the bending stiffness in the lateral width direction of a lateral edge part 184a, 184b, 194, 194b of each splice strap 180, 280 and 190, 290 is less than the bending stiffness of the outer metal layer sheets 110-140 of the outer metal layer 100, 200. Herein, the lateral edge part is defined as extending from an outer lateral edge of a splice strap 180, 190, 280, 290 over a lateral distance of at least 5 times the lateral edge part average thickness. Herein, a lateral distance is defined as being perpendicular to the first and second planar direction P1, P2 of the first and second splice line 150, 160, 250, 260 respectively.

In all of the embodiments shown in FIGS. 1A-8B only parts of the outer layers 100, 200 of the laminates close to the splice lines 150, 160, 250, 260 are shown. The person skilled in the art may understand that any of the metal sheets 110-140, 210-240 of the outer layers 100, 200 respectively may extend further along the first and second planar direction P1, P2 of the stack of the laminate.

The invention claimed is:

1. A laminate comprising:
a stack of mutually bonded adhesive layers and metal layers, wherein an outer metal layer defining an outer surface of the stack comprises metal sheets having overlapping end parts and/or abutting metal sheet edges extending in a first and a different second planar direction of the laminate and defining a first and a second splice line that intersect one another under an angle in a common splicing region; and
a first splice strap connected to the outer surface and covering the first splice line over a first splice strap lateral width; a second splice strap connected to the outer surface and covering the second splice line over a second splice strap lateral width;
wherein the first and second splice straps comprise a stack of at least one metal layer bonded to at least one adhesive layer for connection to the outer surface of the stack, and/or at least one fiber reinforced adhesive layer, and
wherein the bending stiffness $E*t^3$ in the lateral width direction of a lateral edge part of each splice strap is less than the bending stiffness of the outer metal layer sheets, the edge part being defined as extending from an outer lateral edge of a splice strap over a lateral distance of at least 5 times the edge part average thickness.

2. The laminate according to claim 1, wherein the bending stiffness of the edge part is less than 80% of the bending stiffness of the outer metal layer sheets.

3. The laminate according to claim 1, wherein one of the first or the second splice strap covers the common splicing region and the other is interrupted in the common splicing region, or
wherein the first and the second splice straps overlap in the common splicing region to both cover the common splicing region.

4. The laminate according to claim 1, wherein the outer metal layer comprises metal sheets having abutting edges.

5. The laminate according to claim 1, wherein the outer metal layer comprises at least three metal sheets, wherein at least two of the metal sheets have overlapping end parts extending along the first planar direction and at least two of the metal sheets have abutting edges extending along the second planar direction.

6. The laminate according to claim 5, wherein a first metal sheet and a second metal sheet have abutting end parts within a first splicing region, a third metal sheet and a fourth metal sheet have metal sheet edges within a second splicing region arranged substantially coinciding with each other along the second planar direction in the plane of the stack, and wherein the third metal sheet and the fourth metal sheet have overlapping end parts within the first splicing region and the second splicing region with the first and the second metal sheet, respectively.

7. The laminate according to claim 5, wherein the third metal sheet and a fourth metal sheet have abutting end parts within the second splicing region.

8. The laminate according to claim 5, wherein the overlapping end parts of the third metal sheet are arranged at a side of the first metal sheet opposite to the overlapping end parts of the fourth metal sheet arranged at another side of the first metal sheet.

9. The laminate according to claim 1, comprising two of said outer metal layers, one outer metal layer being located at one side of the stack and another outer metal layer being located at another side of the stack opposite the first side, wherein at least one of the two outer metal layers is provided with said first and second splice straps.

10. The laminate according to claim 9, wherein the one outer metal layer has abutting metal sheet edges extending along its first and second planar direction, and the other outer metal layer has abutting metal sheet edges along its first and second planar direction.

11. The laminate according to claim 9, wherein the splice lines of the one outer metal layer and the splice lines of the other outer metal layer are offset with respect to each other over an offset distance.

12. The laminate according to claim 1, comprising a stack consisting of one metal layer and another metal layer with an adhesive layer in between,
wherein at least one of the adhesive layers of the stack and/or of a splice strap comprises reinforcing fibers forming a fiber-reinforced adhesive layer.

13. The laminate according to claim 1, wherein the outer layer of a splice strap is a metal sheet.

14. The laminate according to claim 13, wherein the splice strap is attached to the outer surface of the stack by a fiber reinforced adhesive layer, of which an edge part is substantially free from reinforcing fibers, the edge part being defined as extending from an outer lateral edge of the splice strap over a lateral distance of at least 5 times the average thickness of the outer layer of the splice strap.

15. The laminate according to claim 1, wherein at least one metal layer and/or at least one adhesive layer in a splice strap is interrupted.

16. The laminate according to claim 1, wherein a stiffening element is connected at the common splice region to one splice strap and another, interrupted, splice strap.

17. The laminate according to claim 1, wherein an outer surface of the splice strap is flush with an outer surface of the stack.

18. The laminate according to claim 1, wherein the blunt notch strength of the laminate $P_{bn\ lam}$ is larger than 75%.

19. A structural component for a vehicle, spacecraft, or aircraft, comprising a laminate according to claim 1.

20. The structural component according to claim 19, comprising a wing or a fuselage of an aircraft, wherein the first planar direction is arranged substantially parallel to a longitudinal direction of the wing or the fuselage.

* * * * *